US009599959B2

(12) United States Patent
Dubois et al.

(10) Patent No.: US 9,599,959 B2
(45) Date of Patent: Mar. 21, 2017

(54) METHOD FOR RECORDING GABOR HOLOGRAM

(71) Applicant: Universite Libre de Bruxelles, Brussels (BE)

(72) Inventors: Frank Dubois, Brussels (BE); Catherine Yourassowsky, Brussels (BE)

(73) Assignee: Universite libre de Bruxelles, Brussels (BE)

( * ) Notice: Subject to any disclaimer, the term of this patent is extended or adjusted under 35 U.S.C. 154(b) by 0 days.

(21) Appl. No.: 14/427,223

(22) PCT Filed: Sep. 10, 2013

(86) PCT No.: PCT/EP2013/068683
§ 371 (c)(1),
(2) Date: Mar. 10, 2015

(87) PCT Pub. No.: WO2014/037575
PCT Pub. Date: Mar. 13, 2014

(65) Prior Publication Data
US 2015/0248110 A1 Sep. 3, 2015

(30) Foreign Application Priority Data

Sep. 10, 2012 (EP) .................................... 12183735

(51) Int. Cl.
*G03H 1/04* (2006.01)
*G02B 6/06* (2006.01)
(Continued)

(52) U.S. Cl.
CPC ............. *G03H 1/0404* (2013.01); *G02B 6/06* (2013.01); *G03H 1/0005* (2013.01); *G03H 1/02* (2013.01);
(Continued)

(58) Field of Classification Search
CPC ...... G03H 1/0404; G03H 1/0005; G03H 1/02; G03H 1/0402; G03H 1/0443; G03H 1/26;
(Continued)

(56) References Cited

U.S. PATENT DOCUMENTS 3,567,305 A * 3/1971 Collier ..................... G03H 1/24
356/457
4,589,723 A * 5/1986 Doi .......................... G03H 1/04
359/30

(Continued)

FOREIGN PATENT DOCUMENTS

GB 2267357 A 12/1993
JP 61-201465 A 9/1986
(Continued)

OTHER PUBLICATIONS

Zoltán Göröcs et al.; Multi-color digital holographic microscope (DHM) for biological purposes; publication; 2010; 10 pages; Proc. of SPIE vol. 7568.
(Continued)

*Primary Examiner* — Frank Font
(74) *Attorney, Agent, or Firm* — Reinhart Boerner Van Deuren P.C.

(57) ABSTRACT

The present invention is related to an holographic probe device for recording a gabor hologram comprising: a coherent optical fiber bundle comprising a distal end and a proximal end; a recording medium optically coupled to the proximal end of the coherent optical fiber bundle; a light source producing in use a single light beam, illuminating the distal end of the coherent optical fiber bundle and the object to be observed.

12 Claims, 3 Drawing Sheets

(51) Int. Cl.
*G03H 1/26* (2006.01)
*G03H 1/02* (2006.01)
*G03H 1/00* (2006.01)

(52) U.S. Cl.
CPC ......... *G03H 1/0402* (2013.01); *G03H 1/0443* (2013.01); *G03H 1/26* (2013.01); *G03H 1/265* (2013.01); *G03H 2001/005* (2013.01); *G03H 2001/0216* (2013.01); *G03H 2001/0413* (2013.01); *G03H 2001/0447* (2013.01); *G03H 2223/16* (2013.01); *G03H 2223/17* (2013.01)

(58) Field of Classification Search
CPC ..... G03H 2001/005; G03H 2001/0452; G03H 2223/16; G02B 6/06; G02B 21/06
USPC ....... 359/22, 30, 34, 370, 385; 385/116, 117
See application file for complete search history.

(56) References Cited

U.S. PATENT DOCUMENTS

| | | | | |
|---|---|---|---|---|
| 4,792,196 | A * | 12/1988 | Raviv | G03H 1/04 359/22 |
| 5,127,078 | A * | 6/1992 | Terry | G02B 6/06 348/E13.031 |
| 5,184,232 | A * | 2/1993 | Burney | G03H 1/0005 348/40 |
| 5,381,249 | A * | 1/1995 | Burney | G03H 1/00 348/40 |
| 7,239,782 | B1 * | 7/2007 | Treado | A61B 1/00165 356/301 |
| 2005/0088749 | A1 * | 4/2005 | Kremen | G02B 25/008 359/619 |
| 2008/0007733 | A1 * | 1/2008 | Marks | A61B 5/0066 356/477 |
| 2012/0092979 | A1 * | 4/2012 | Wang | G11B 7/268 369/103 |

FOREIGN PATENT DOCUMENTS

| | | |
|---|---|---|
| JP | 62-042178 | 2/1987 |
| JP | 62042178 | 2/1987 |

OTHER PUBLICATIONS

Jorge Garcia-Sucerquia et al.; Digital in-line holographic microcopy; publication; Feb. 10, 2006; 15 pages; Applied Optics, vol. 45, No. 5.
S.K. Jericho et al.; Submersible digital in-line holographic microscope; publication; Apr. 12, 2006; 11 pages; Review of Scientic Instruments 77, 043706 (2006).
M. Nazarathy et al.; Fourier optics described by operator algebra; publication; Feb. 1980; 10 pages; J. Opt. Soc. Am., vol. 70, No. 2.
D. Gabor; Microscopy by reconstructed wave-fronts; publication; Feb. 17, 1949; 40 pages; Royal Society Publishing.

* cited by examiner

METHOD FOR RECORDING GABOR HOLOGRAM

FIELD OF THE INVENTION

The present invention is related to a method and a device for recording a gabor hologram.

STATE OF THE ART

Due to the high numerical apertures of the microscope lenses and the high magnification ratios, optical microscopy is often limited by the small depths of focus. Its increase is thus an important goal in optical microscopy. An approach to enable the refocusing of objects recorded out of focus is based on digital holography microscopy (DHM) where the hologram is recorded with a CCD camera. The holographic reconstruction or refocusing is performed by digital computation. Digital holographic microscopy is an emerging technology with numerous applications thanks to its quantitative phase contrast imaging and its refocusing of objects in depth.

The hologram is acquired by recording the optical interference pattern between the light scattered by the object with an un-scattered beam, the reference beam. There are several ways to implement this recording scheme.

There exists interferometric configurations where the object and the reference beams are separated into two different optical paths. After the object beam is scattered by the object, the beams are recombined on a camera sensor where they interfere.

Thanks to digital hologram processing, those configurations provide the refocusing and the quantitative phase contrast imaging and match now an increasing number of applications.

In in-line digital holographic microscopy, there is a unique beam that illuminates the object in transmission. The diffracted beam by the object (object beam) interferes with the surrounding un-diffracted beam (reference beam) on a recording plane such as described by Z. Gorocs et Al. in "multi-color digital holographic microscope (DHM) for biological purposes" Proc. Of SPIE Vol. 7568 75681P-1. This process can be realized with or without a lens between the object and the recording plane. The role of the optional lens is to adapt the magnification.

When compactness is a crucial point, in-line holography is often used, with transmission illumination, without a lens between the object and the sensor and without a separated reference beam as described for example by Jorge Garcia-Sucerquia et Al. in APPLIED OPTICS 45, 836-850 (2006) or S. K. Jericho et al., in Rev. Sci. Instrum. 77, 043706; doi:10.1063/1.2193827 (2006). With this configuration, as shown by FIG. 1, the coherent illumination beam is incident on the object. The part of the beam scattered by the object is incident on the sensor where it interferes with the un-scattered illumination beam. It is basically the first Gabor configuration (D. Gabor, Proc. Roy. Soc. Ser. A 197, 454 (1949)), where the classical photographic plate is replaced by a camera sensor to perform the holographic reconstruction by computer.

In In-line holography, the intensity that is recorded is expressed by:

$$i(x,y)=|r(x,y)+o(x,y)|^2=|r|^2+|o|_2+o^*r+or^* \quad (1)$$

Where (x,y) are the spatial coordinates on the detector, r(x,y) is the reference beam (the un-diffracted beam by the object), and o(x,y) is the object beam (beam scattered by the object). For the sake of simplicity, we omitted the spatial dependency (x,y) in the right hand side of Eq. (1). Assuming that the object size is small with respect to the distance to the sensor, $|o|^2$ can be neglected.

The intensity of the reference $|r|^2$ can be recorded once a time and can be subtracted to Eq. (1). It results that it remains:

$$i'=o^*r+or^* \quad (2)$$

In the following, we will assume that the suppression of $|r|^2$ is always performed.

Eq. (2) describes the recorded hologram. If we assume that the reference is a plane wave propagating perpendicularly to the sensor, we obtain i'=A(o*+o), where A is a constant. The refocusing of the object recorded with a defocus distance d is obtained by applying the Kirchhoff-Fresnel (KF) propagation over a distance −d on i'. We note this operation by $u_r=R[-d]i'$. As i' is constituted by the addition of the object amplitude and its complex conjugate, the application of the KF propagation gives rise to the addition of the refocused object with a second term that is called the twin image.

In-line holography suffers from two drawbacks, with respect to the interferometric implementations, that are:
  the presence of the twin image accompanying any refocused object,
  there is basically no straightforward recorded optical phase information that drastically reduces the amount of recorded information.

However, the optical phase information is directly linked to the quantitative phase contrast imaging capability of DHM and is very important in numerous applications to measure the optical thickness of the samples (Living cells, . . . ). It has to be noticed that the twin image results from the fact that the optical phase information is unknown in the recording plane. If there is a way to get the phase information, it can be combined with the intensity information obtained by the in-line holography. The twin image is then removed during the digital holographic refocusing.

Transmission of the hologram thru a fiber is known from patent document JP60/042178A, but, in the proposed setup, a unique fiber is scanned synchronously at both ends of the fiber, increasing the complexity and size of the system. In this document the hologram is reconstructed at the proximal end by the scanning procedure. Such a device also presents the drawback that moving objects can't be imaged, due to the limited scanning speed.

Miniaturization is an important topic because there is an increasing need to be able to perform measurement on experimental devices that are of reduced size, as for example "lab on chips" devices. There is also a need to be able to implement "in situ" measurement probes that will not disturb the experimental process.

Aims of the Invention

The present invention aims to further increase the miniaturization of In-Line holography and to take benefit of the gained compactness to further improve the digital holographic process with in particular the retrieval of the optical phase information.

SUMMARY OF THE INVENTION

The present invention is related to a holographic probe device for recording a gabor hologram comprising:

a coherent optical fiber bundle comprising a distal end and a proximal end;

a recording medium optically coupled to the proximal end of the coherent optical fiber bundle;

a light source producing in use a single light beam, illuminating the distal end of the coherent optical fiber bundle and the object to be observed.

Preferably, the light source is selected from the group consisting of LED, laser, and gas discharge tubes.

Advantageously, the light source comprise an optical fiber for guiding the light from the light source and forming the beam.

Preferably, the recording medium is a CMOS or a CCD image sensor.

Advantageously, the recording medium is optically coupled to the proximal end of the coherent optical fiber bundle by either direct contact or by means of a lens forming an image of the proximal end of the coherent optical fiber bundle on said recording medium.

Another aspect of the invention is related to an optical device comprising more than one holographic probe device according to the invention for simultaneously recording more than one hologram of the same object under different angles.

Preferably, the least two holographic probe device according to the invention are disposed with their distal ends (front recording plane) perpendicular to each other.

Advantageously, the distal ends of two holographic probe devices according to the invention are disposed on the same optical axis in opposite direction. (parallel front recording planes or distal ends)

Preferably, the proximal end of each coherent optical fiber bundle of each holographic probe device is optically coupled to the light source of the opposite hologram recording device.

An advantage of the invention is that no lens is necessary between the object and the distal end(s) of the fiber bundle(s) for forming (a) lens free hologram(s).

A third aspect of the invention is related to a method for recording a Gabor hologram comprising the step of:

providing a coherent optical fiber bundle comprising a distal end and a proximal end, the proximal end being optically coupled to a recording medium;

lighting the distal end of the coherent optical fiber bundle and an object to be observed by means of a single at least partially coherent light beam, thereby producing a Gabor hologram on the distal end of the coherent bundle;

recording the Gabor hologram transmitted through the coherent optical fiber bundle on the plane recording medium.

Preferably, more than one gabor hologram is recorded by using more than one light beam, each of them illuminating a separate coherent optical fiber bundle.

FIGURE KEYS

Figure 1:
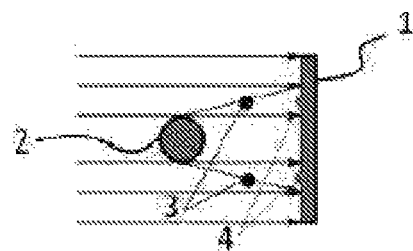
FIG. 1 represents an in-line hologram recording configuration.

1, 101, 201: front recording plane (distal end of the fibre bundle
2: Object
3: diffracted light
4: interference
5: incoming light beam
6, 106, 206: coherent optical fibre bundle (endoscope or light conduit)
7, 107, 207: recording medium
8, 108, 208: light source
9: focal distance
10: light source lens
11: L: distance from distal end of the fibre bundle to the light source
12: recording lens
13: holographic probe device
114, 214: beam splitter
s1-3: point-like sources having specific wavelength bandwidths
f: focal length of the collimating lens
Dp1-3: Extension of the diffraction patterns created, respectively, by the sources s1-3

DETAILED DESCRIPTION OF THE INVENTION

The basic concept consists to use coherent optical fiber bundle or endoscopes 6, also called image conduit, to record in-line digital hologram. Coherent optical fiber bundle 6 are constituted by an organized bundle of optical fibres in such a way that the image formed on one side of the bundle (input plane 1 at distal end of the bundle) is transmitted to the other side of the fibre bundle (output plane at proximal end of the bundle) and is available for the observation where it is recorded by a 2D electronic sensor 7 (camera).

As the light intensity distribution at the input plane 1 of the image conduit is transmitted up to the sensor 7, with some resolution constraints, we will consider that this light distribution is also the recorded one.

Figure 2:
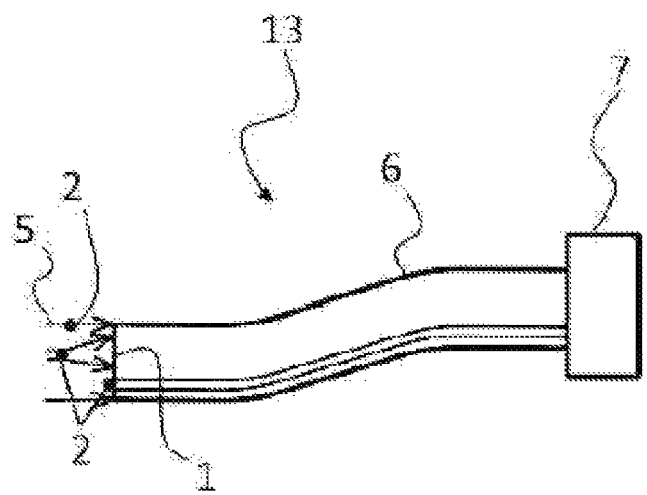
FIG. 2 represents an example of In-line holographic probe device for recording a gabor hologram according to the invention.

The initial configuration to record in-line lens free hologram with a fibre endoscope 6 or image conduit is shown by the FIG. 2.

The object 2 (for example a 3D distribution of particles) is illuminated by a directional optical beam 5 that can be generated by a laser or by a Light Emitting Diode illumination. The object 2 diffracts the illumination beam 5 in such a way that the diffracted pattern interferes with the un-diffracted illumination beam at the input window 1 of the fibre endoscope 6.

The interference pattern, that results in a spatial intensity distribution is transmitted at the output plane where it is detected by a two dimensional sensor 7 that records the intensity distribution. This recorded light intensity distribution can be handled by the usual processing of in-line holography for 3D imaging. Note that a miniature optical system as a lens can be also placed in front of the input plane of the fibre endoscope to adjust the magnification of the experimental volume. But, in that case, in order to observe interference fringes, the object 2 should be out of focus with regards to the input plane 1.

It has to be observed that the coherent fibre bundle 6 makes possible to record the intensity distribution in a very simple way at locations difficult to reach with other optical configurations. In this way, it is possible to directly place the input window 1 of the fibre endoscope 6 in contact with a fluid in a microfluidic device, which is complex to perform directly with an image sensor.

The coherent fibre bundle 6 or image conduit has a typical window width of few millimeters with individual fibre of few micrometers. Image conduits with typically 50.000 individual optical fibres are commercially available. That gives a limited resolution, but it is a technology under development that can be improved.

Figure 3:
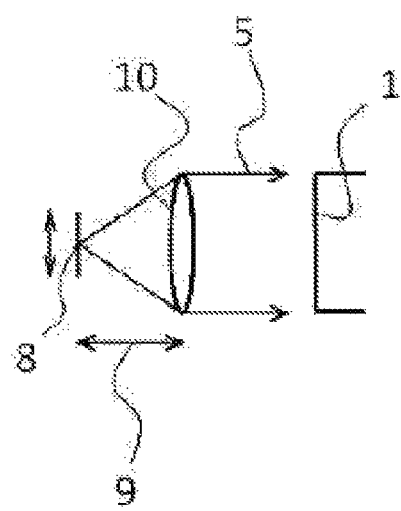
FIG. 3 represents an example of illumination scheme that can be used in the present invention.
Figure 4:
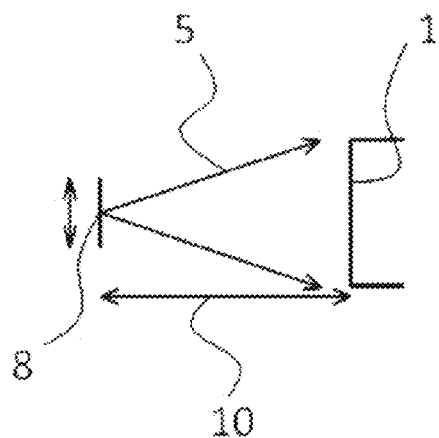
FIG. 4 represents an example of illumination scheme that can be used in the present invention.

The illumination can be obtained by collimated or diverging beams 5 as shown respectively by FIGS. 3 and 4. Preferably, the light beam presents good spatial coherence in order to avoid blurring of the recorded interference patterns.

For spatially incoherent sources, the spatial coherence characteristics are expressed by conditions on the source 8 diameters s as shown by the FIG. 3. In the collimated configuration, let us consider the reconstruction of a point that is out of focus with a distance d with respect to the recorded plane 1 (input window of the image conduit). We have s=f$\Delta$e/d, where f is the focal length 9 of the lens and $\Delta$e the width of the point spread function specifically generated by the diameter s of the source.

Similarly, for a diverging beam, we have s=L$\Delta$e/d, where L is the distance 11 between the source 8 and the recoding plane 1. In practical situations, the typical size of s is few hundred micrometers. Therefore, depending on the depth of reconstruction, it is not necessary to have a full spatial coherence illumination although full coherent illumination can be used.

The constraints on the temporal coherence are estimated by considering a scattering object 2 located at a distance d from the recording plane 1. Assuming that the numerical aperture of the fibres is NA, it can be shown that the maximum optical path difference is $\Delta p = NA^2 d/8$ that has to be smaller that the coherence length expressed by $\lambda^2/\Delta\lambda$. It results that $\Delta\lambda < 8\lambda^2/NA^2 d$ that is typically corresponding to $\Delta\lambda \approx 10$ nm. This spectral width is compatible with the ones of the light emitting diodes eventually filtered by an interference filter.

It results that light emitting diode (LED) filtered by a small aperture is convenient. It is also possible to work with laser beam that can be of reduced temporal coherence. Advantageously, a compact illumination scheme consists to illuminate the sample with an optical fibre optically coupled to a laser or a LED.

Figure 5:
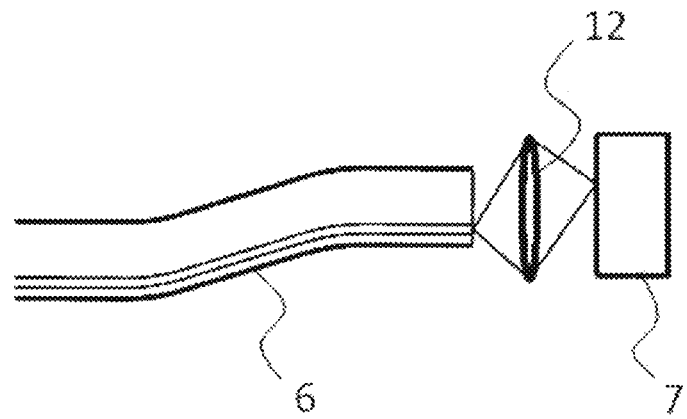
FIG. 5 represents an example of recording scheme at proximal end of a coherent fibre bundle.

The light distribution transmitted by the image conduit 6 is reaching the output side of plane where it is recorded by the sensor 7. This coupling can be realized by placing the output plane very close to the sensor or by adding some imaging lens 12 as shown in FIG. 5.

A significant advantage of the invention is compactness in such a way that several devices can advantageously be implemented, to perform multiple measurements of the same experimental volume. In the following example, we will call each system as described here above as "elementary device" 13 or holographic probe device 13 or simply probe 13. There are several interesting configurations to combine elementary devices 13.

When more than one elementary device 13 is used, the light originating from the diffusion on the object 2 of the light from one elementary device 13 can be filtered out of the other elementary device 13 illumination by an appropriate combination of polarizers and/or wave plates, by the use of different wavelengths for the different elementary devices combined with barer filters placed in front of the sensors in order to keep the only right wavelength range on each sensor or by using temporally separated light pulse.

Figure 6:
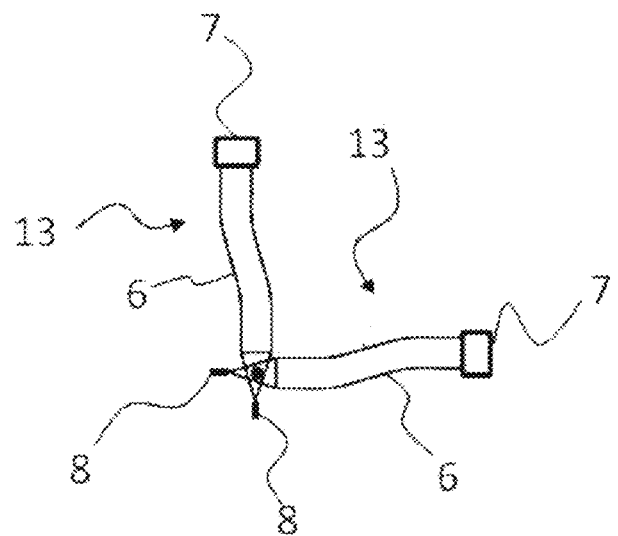
FIG. 6 represents an example of an optical device comprising more than one holographic probe device according to the invention with the distal recording planes perpendicular to each other.

The FIG. 6 shows the implementation of two elementary devices 13 placed in perpendicular viewing directions.

This configuration with two elementary devices 13 has a high potential in the field of applications for 3D measurements such as 3D velocymetry. Indeed, when digital holography is used to performed 3D velocymetry, there is an issue with the resolution along the optical axis that is lower than the resolution in the transversal directions. By combining the holograms in both directions, the proposed configuration overcomes this limitation by providing the highest resolution in every direction. Due to the compactness of the elementary devices 13, it is possible to increase the number of elementary devices to increase the accuracy of the measurements.

Advantageously, the two, or the multiple fibre endoscopes 6 could be connected to a single camera.

Figure 7:
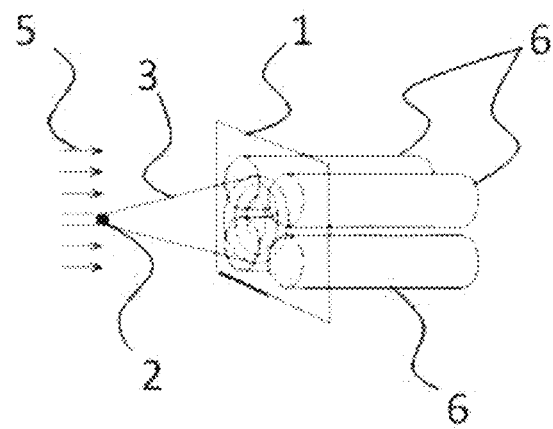
FIG. 7 represents an example of an optical device comprising more than one holographic probe device according to the invention, with the distal recording planes parallel to each other, side by side.

Several elementary devices 13 can be placed side by side in order to increase the field of view and the resolution by an effective increase of the numerical aperture. The individual recorded images are combined in larger unique hologram for the processing. The recording configuration is shown by FIG. 7.

The images conduits 6 can be connected to the same sensor or to different ones.

Figure 8:
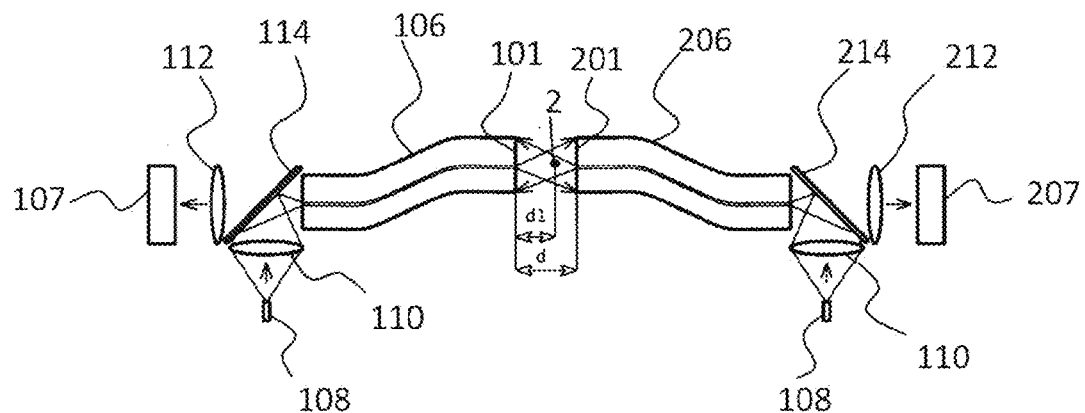
FIG. 8 represents an example of an optical device comprising more than one holographic probe device according to the invention, with the distal recording planes parallel to each other, in opposite direction (face to face).

Thanks to the compactness of the elementary devices 13, it is also possible to observe an experimental volume with two opposite elementary devices as shown by the FIG. 8.

In the opposite elementary devices configuration, two in-line holograms of the sample recorded with opposite directions are recorded with two elementary devices. The illumination of the hologram recorded by the first elementary device (comprising the elements 101,107,112,114,106, 108 and 110 in FIG. 8) is realized with a small size source 108 that is focalized on the output plane of the image conduit 206 of the second elementary device. Few optical fibres of the image conduit 206 is transmitting the light up to the output plane. The light emerges out the input plane 201 of the second elementary device as a diverging beam and illuminates the sample or the object 2.

A first hologram of the object is reaching the recording plane 101 of the image conduit 106 and is transmitted up to the sensor 107. Alternatively, other illumination schemes can be achieved, by adding, for example, external illumination by optical fibers.

The symmetric configuration allows to record a second hologram by the sensor 207. If necessary, the back reflexion of the illumination of the object 2 by the second (first) light source 208 (108) to the input plane 101 (201) of the first (second) image conduit 106 (206) and transmitted towards sensor 101 (201) can be eliminated by an appropriate combination of polarizers and/or wave plates, of by the use of different wavelengths for the first and second light source 108,208 combined with barer filters placed in front of the sensors 107,207 in order to keep the only right wavelength range on each sensor 107,207.

The configuration of FIG. 8 allows to retrieve the optical phase associated to the sample. It is a significant improvement with respect to the usual in-line holographic scheme.

Consider that an object of complex transmittance t is placed at the distance $d_1$ from the recording plane of the image conduit 1. The two recording planes 101,201 of the image conduits are separated by a distance d. For the sake of simplicity, we assume the wavelengths of the both light sources 108,208 are identical. The generalization to two different wavelengths is straightforward as shown in the following.

It can be shown that the distribution amplitude $i_1$ and $i_2$, on, respectively, the input planes of the image conduits 106,206, are expressed by:

$$i_1 = Q\left[\frac{1}{d_1}\right]V\left[\frac{1}{\lambda d_1}\right]U + Q^*\left[\frac{1}{d_1}\right]V\left[\frac{1}{\lambda d_1}\right]U^* \quad (3)$$

$$i_2 = Q\left[\frac{1}{d_2}\right]V\left[\frac{1}{\lambda d_2}\right]U + Q^*\left[\frac{1}{d_2}\right]V\left[\frac{1}{\lambda d_2}\right]U^*$$

Where we use the operator algebra defined by Joseph Shamir, in "Optical Systems and Processes", SPIE PRESS 1999, and we omitted to indicate the spatial dependency to simplify the reading. The superscript * denotes the complex conjugate operation.

We have:
The quadratic phase factor defined by $$Q\left[\frac{1}{a}\right] = \exp\left\{j\frac{k}{2a}(x^2 + y^2)\right\},$$

where k is the wave number defined by $k=2\pi/\lambda$ and $j=\sqrt{-1}$. V[b] is the scaling operator defined by $V[b]g(x,y)=g(bx,by)$.

$$U = F^{\pm 1}Q\left[\frac{1}{d_1} + \frac{1}{d_2}\right]t,$$

where $F^{\pm}$ is the Fourier transform operations defined by:

$$F^{\pm 1}g = \int_{-\infty}^{\infty}\int_{-\infty}^{\infty} \exp\{\mp 2\pi j(xu + vy)\}g(x, y)\,dx\,dy$$

By applying to $i_1$ and $i_2$, respectively, the scaling operators $V[d_1/d]$ and $V[d_2/d]$, we obtain:

$$i'_1 = Q\left[\frac{d_1}{d^2}\right]U' + Q^*\left[\frac{d_1}{d^2}\right]U'^* \quad (4)$$

$$i'_2 = Q\left[\frac{d_2}{d^2}\right]U' + Q\left[\frac{d_2}{d^2}\right]U'^*$$

Where $U'=V[1/\lambda d]U$. By decomposing the real and imaginary parts of the Eq. (4), we obtain a system of equations that can be solved, by an adequate choice of $d_1$ and $d_2$. Therefore U' is determined and we can go back to the real and imaginary parts of t by a scaling, a Fourier transformation and by the multiplication by a quadratic phase factor. The optical phase of t results by computing $\phi=\arctan_{2\pi}(t_{imaginary}/t_{real})$.

The holographic recording with an image conduit can advantageously be performed at several discrete wavelengths, and in particular in the red, green and blue wavelengths (or Cyan, Magenta and Yellow or any suitable wavelength combination). We assume that an object separated by a distance d with respect to the recoding plane is illuminated by a two-wavelengths collimated beam. The illumination by a diverging beam slightly changes the following derivation but does not modify the principle.

For the sake of simplicity, we assume that the object is illuminated by a red beam (630 nm) and a green beam (530 nm).

The two-wavelengths light distributions are recorded separately by the sensor. By using the In-line holography expression, we obtain the two following holographic signals:

$$i_1 = u_1 + u^*_1$$

$$i_2 = u_2 + u^*_2 \quad (5)$$

Where $u_1$ and $u_1$ are the complex amplitudes of the object t propagated from the object plane up to the recording plane by the Kirchhoff-Fresnel propagation at the wavelength $\lambda_1$ and $\lambda_2$.

Using the previous notations, they can be expressed by:

$$u_n = F^{-1}Q[-\lambda_n^2 d]Ft \quad (6)$$

Where n=1, 2.

The diffraction pattern with the wavelength $\lambda_2$ can be alternatively seen as obtained at wavelength $\lambda_1$ with a distance $d'=d\lambda_2/\lambda_1$. Therefore, the holographic signals of Eq. (5) can be considered as obtained for a single wavelength $\lambda_1$ but for two propagation distances d and d'. Using this fact and Eq. (6), Eq. (5) is rewritten by:

$$i_1 = F^{-1}Q[-\lambda_1^2 d]Ft + F^{-1}Q[\lambda_1^2 d]Ft^*$$

$$i_2 = F^{-1}Q[-\lambda_1^2 d']Ft + F^{-1}Q[\lambda_1^2 d']Ft^* \quad (7)$$

We separate t in its real and imaginary parts, $t=t_r+jt_j$. We compute the Fourier transformation of the two Eq. (7) to obtain:

$$I_1 = Q[-\lambda_1^2 d](T_r+jT_j) + Q[\lambda_1^2 d](T_r-jT_j)$$

$$I_2 = Q[-\lambda_1^2 d'](T_r+jT_j) + Q[\lambda_1^2 d'](T_r-jT_j) \quad (8)$$

Where $T_r$ and $T_j$ are the Fourier transformation of $t_r$ and $t_j$. The Eqs. (8) constitute a set of 2 equations, with the unknown $T_r$ and $T_j$ that are easy to solve according that $q=\sin\{\pi\lambda(u^2+v^2)(d-d')\}\neq 0$, where (u,v) are the spatial frequencies. The quantity $q=0$ when $(u,v)=(0,0)$ and when $\pi\lambda(u^2+v^2)(d-d')=m\pi$. The first singularity corresponds to a constant value over the field of view that is not significant, and the second singularity can be removed by using a three-wavelengths illumination.

Therefore by computing the inverse Fourier transformation of $T=T_r+jT_j$, we obtain the complex amplitude t that provides the optical phase of the object.

The multi directional measurement of the optical phase of a sample provides a tool to measure the 3D measurement of the optical phase information. This is called optical tomography. The multi wavelengths approach to perform multiple measurement of a sample can enable such measurement.

Spatially Separated Illumination

Advantageously, several optical sources having different wavelengths illuminate the sample with different directions. This is illustrated by the FIG. 9.

Figure 9:
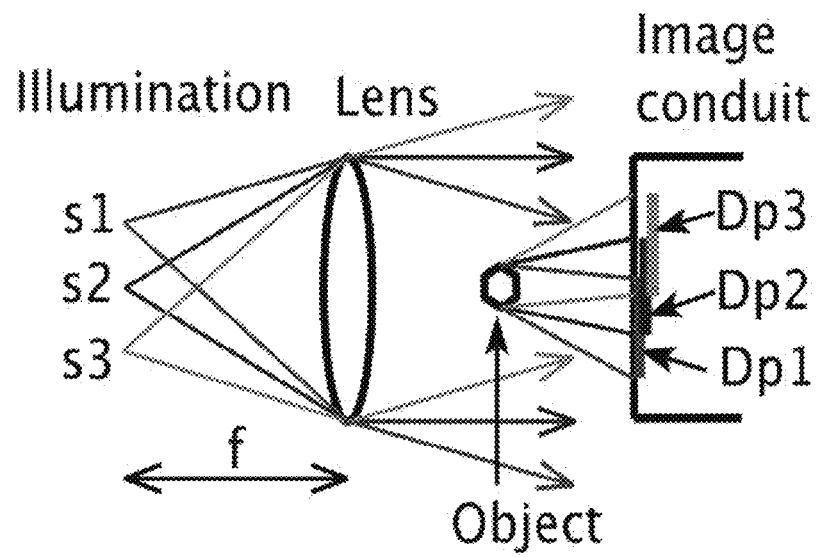
FIG. 9 represents an example of an optical device comprising more than one light source, of different wavelength, illuminating the same fiber bundle.

In the FIG. 9, several point-like sources are placed at different locations in the front focal plane of a lens. After propagation through the lens, each source gives rise to collimated beams with their own propagation directions.

The several collimated beams illuminate the object, placed between the lens and the input plane of the image conduit. Each illumination beam, diffracted by the object, will give rise to spatially shifted diffraction patterns at the input plane of the image conduit. The wavelength bandwidths of the different sources are selected in such a way that it is possible to separate the contributions when detected by the sensor. As there are shifts between the recorded diffraction patterns, the digital holographic refocusing provides spatially separated reconstructed images of the object. The separation amounts are directly proportional to the distance between the object and the sensor. It results that the separations can be used to measure the distance between the object and the sensor. This measurement capability improves the accuracy that is obtained by the only digital holographic refocusing.

This type of multisource illumination can be also used in the case of the spherical illumination. It can be also coupled with the multi-image conduit configurations that are described.

The invention claimed is:

1. A holographic probe device for recording a Gabor hologram comprising:
    a coherent optical fiber bundle comprising a distal end and a proximal end;
    a recording medium optically coupled to the proximal end of the coherent optical fiber bundle;
    a light source adapted to produce a single light beam, wherein the single light beam is adapted to illuminate the distal end of the coherent optical fiber bundle and an object to be observed.

2. The holographic probe device according to claim 1, wherein the light source is selected from the group consisting of LED, laser, and gas discharge tubes.

3. The holographic probe device according to claim 1, wherein the light source comprise an optical fiber to guide the single light beam.

4. The holographic probe device according to claim 1, wherein the recording medium is a CMOS or a CCD image sensor.

5. The holographic probe device according to claim 1, wherein the recording medium is optically coupled to the proximal end of the coherent optical fiber bundle by either direct contact or by means of a lens; and
    wherein an image is formed on the recording medium by the proximal end of the coherent optical fiber bundle.

6. An optical device comprising:
    a first and second holographic probe device, each holographic probe device according to claim 1, wherein the first holographic probe device is situated at a first angle relative to an object to be observed and the second holographic probe device is situated at a second angle relative to the object to be observed.

7. The optical device according to claim 6, wherein the distal end of the coherent optical fiber bundle of the first holographic probe device is perpendicular to the distal end of the coherent optical fiber bundle of the second holographic probe device.

8. The optical device according to claim 6, wherein the first holographic probe device is parallel with the second holographic probe device; and
    wherein the distal end of the coherent optical fiber bundle of the first holographic probe device is aligned with the proximal end of the coherent optical fiber bundle of the second holographic probe device.

9. The optical device according to claim 8, wherein the proximal end of the coherent optical fiber bundle of the first holographic probe device is optically coupled to the light source of a recording device of the second holographic probe device; and
    the proximal end of the coherent optical fiber bundle of the second holographic probe device is optically coupled to the light source of a recording device of the first holographic probe device.

10. The optical device according to claim 6, wherein no lens is situated between the first holographic probe device and the object to be observed; and
    wherein lens is situated between the second holographic probe device and the object to be observed.

11. A method for recording a Gabor hologram comprising the step of:
    providing a coherent optical fiber bundle comprising a distal end (and a proximal end, the proximal end being optically coupled to a recording medium;
    lighting the distal end of the coherent optical fiber bundle and an object to be observed by means of a single at least partially coherent light beam, thereby producing a Gabor hologram on the distal end of the coherent bundle;
    recording the Gabor hologram transmitted through the coherent optical fiber bundle on the recording medium.

12. The method according to claim 11 wherein more than one Gabor hologram is recorded by using more than one light beam, each light beam illuminating a separate coherent optical fiber bundle.

* * * * *

UNITED STATES PATENT AND TRADEMARK OFFICE
CERTIFICATE OF CORRECTION

PATENT NO. : 9,599,959 B2  
APPLICATION NO. : 14/427223  
DATED : March 21, 2017  
INVENTOR(S) : Frank Dubois et al.

Page 1 of 1

It is certified that error appears in the above-identified patent and that said Letters Patent is hereby corrected as shown below:

In the Claims

Column 10, Line 39, Claim 11, reads "distal end (and a proximal end, the proximal end being" and should read --distal end and a proximal end, the proximal end being--

Signed and Sealed this
Thirtieth Day of May, 2017

Michelle K. Lee
*Director of the United States Patent and Trademark Office*